United States Patent
Herz et al.

(10) Patent No.: US 8,043,451 B2
(45) Date of Patent: Oct. 25, 2011

(54) WEDGE-SHAPED HEATING ELEMENT AND METHOD FOR PRODUCING IT

(75) Inventors: Franz-Josef Herz, Neuwled (DE); Jan Werner, Montabaur (DE)

(73) Assignee: Herz GmbH (DE)

( * ) Notice: Subject to any disclaimer, the term of this patent is extended or adjusted under 35 U.S.C. 154(b) by 1082 days.

(21) Appl. No.: 11/252,869

(22) Filed: Oct. 19, 2005

(65) Prior Publication Data
US 2006/0108070 A1 May 25, 2006

(30) Foreign Application Priority Data
Oct. 19, 2004 (DE) .................. 10 2004 051 045

(51) Int. Cl.
*B32B 37/00* (2006.01)
(52) U.S. Cl. .......... 156/71; 156/499; 156/544; 156/555; 156/574; 156/582
(58) Field of Classification Search .............. 156/499, 156/544, 574, 71, 579, 555, 582
See application file for complete search history.

(56) References Cited

U.S. PATENT DOCUMENTS

| | | | |
|---|---|---|---|
| 2,730,161 A | | 1/1956 | Langer |
| 4,591,087 A | * | 5/1986 | Frasch ................ 228/110.1 |
| 4,894,112 A | * | 1/1990 | Lippman .............. 156/308.4 |
| 4,923,829 A | * | 5/1990 | Yasutomi et al. ........ 501/95.3 |
| 5,051,148 A | * | 9/1991 | Resch ................... 156/358 |
| 5,880,432 A | * | 3/1999 | Radmacher ............. 219/270 |
| 2002/0158060 A1 | * | 10/2002 | Uchiyama et al. ....... 219/444.1 |

FOREIGN PATENT DOCUMENTS

| | | |
|---|---|---|
| EP | 0406223 | 1/1991 |
| EP | 1452261 | 9/2004 |
| EP | 1647392 | 4/2006 |
| GB | 817913 | 8/1959 |
| JP | 05278114 | 10/1993 |
| JP | 05278115 | 10/1993 |

OTHER PUBLICATIONS

European Search Report dated May 4, 2007 from counterpart European patent application.

* cited by examiner

*Primary Examiner* — James Sells
(74) *Attorney, Agent, or Firm* — Timothy J. Klima; Shuttleworth & Ingersoll, PLC

(57) ABSTRACT

The invention relates to a wedge-shaped heating element (or heating wedge) for an apparatus for contact welding of plastic films or plastic sheets (2, 3) and to a method for producing it. In order to provide that the heating element (1) is usable for different plastic materials and has high strength, high abrasion resistance, and high temperature and thermal shock resistance to approximately 800° C., as well as corrosion resistance to the chemical factors that occur in welding various polymer materials, the invention proposes that a ceramic material be used as the material for the heating element (1). In order furthermore to provide that the heating element (1) also has a thermal conductivity that is comparable to metals, it has proved especially advantageous if the heating element (1) comprises a composite material, the latter being composed of a ceramic basic material and a heat-conducting material, in particular a metal or metalloid, so that the heating element (1) on the one hand has the mechanical and chemical properties of the ceramic basic material and also approximately the heat-conducting properties of the heat-conducting metal.

13 Claims, 1 Drawing Sheet

WEDGE-SHAPED HEATING ELEMENT AND METHOD FOR PRODUCING IT

Figure 1:
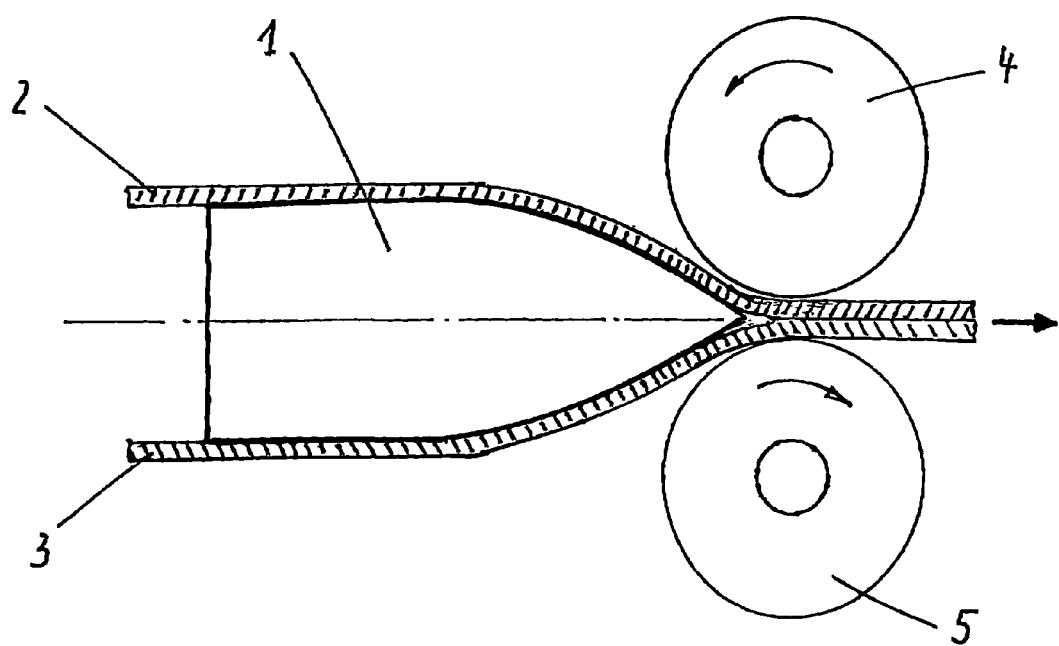

This application claims priority to German Patent Application DE 102004051045.8 filed Oct. 19, 2004, the entirety of which is incorporated by reference herein.

The invention relates to a wedge-shaped heating element for an apparatus for contact welding, especially of plastic films or plastic sheets, and to a method for producing it. In the industry, besides the term "wedge-shaped heating element", the terms "heating wedge" and "welding wedge" are also customary.

Known heating wedges are typically produced from metals which have the high thermal conductivity required for the welding process. However, it is a disadvantage of these heating wedges that for different plastics, heating wedges of different metals are needed. This requires time-consuming conversion of the welding units when the plastic materials to be welded are changed.

Also, in aluminum or copper heating wedges, in the event of operator error, the relatively high ductility of these materials, leads to mechanical damage to the heating wedges so that they cannot continue to be used, since the resultant scratches and so forth on the surface of the heating wedge lead to imperfect welding seams.

Conversely, steel heating wedges have the disadvantage that they require long warm-up times and often do not have good heat distribution, while silver heating wedges are relatively expensive and have severe abrasion.

Moreover, metal heating wedges, when welding robots are used in sealing dumps and in tunnel construction, are subject to severe wear, because of the contaminants (for instance from the soil) that unavoidably occur there.

In welding PVC (polyvinyl chloride), a certain thermal decomposition of the plastic can occur because of the relatively high welding temperatures. As products of decomposition, chlorine and hydrochloric gas, among others, can occur, which have a harmful corrosive effect on the metal heating wedges.

Finally, when plastic films are welded using a metal heating wedge, the various heated films often stick to the metal wedge.

The object of the invention is to disclose a wedge-shaped heating element which can be used for different plastic materials and has not only high strength, high abrasion resistance, and high temperature and thermal shock resistance to approximately 800° C. but also corrosion resistance to the chemical factors (influences) that occur in welding various polymer materials. Moreover, sticking of the plastic to the surface of the particular heating wedge when it is used as intended is to be avoided. The invention also has the object of disclosing a method for producing such a heating element.

With regard to the heating element, this object is attained according to the invention by the characteristics described herein, and in terms of the method it is also attained by the characteristics described herein. Further particularly advantageous features of the invention are disclosed herein.

The invention is based substantially on the concept of using a ceramic material as the material for the heating element (or heating wedge). In order to provide that the heating element also has a thermal conductivity that is comparable to metals, it has proved especially advantageous if the heating element comprises a ceramic material or a composite material, the latter being composed of a ceramic basic material and a heat-conducting material, in particular a metal or metalloid, so that the heating element on the one hand has the mechanical and chemical properties of the ceramic basic material and also approximately the heat-conducting properties of the heat-conducting metal or metalloid.

Surprisingly, it has been demonstrated that if such a heating element is used, no sticking of the plastic films to the applicable surface of the heating element occurs. Moreover, the heating elements according to the invention have a lesser weight than comparable heating elements of metal, are acid-resistant and abrasion proof, have optimal heat distribution and a fast warm-up time, and are suitable for practically all plastic materials to be welded.

The production of the heating element with a predetermined required profile, and made of the composite material, is done by means of a suitable process technique, either during the ceramic production process or directly afterward, for instance by liquid- or gas-phase infiltration of a heat-conducting metal, such as aluminum, copper, or silver, resulting in a solid body that is distinguished by a closed microstructure and whose properties are approximately equivalent to the properties of the individual components.

The ceramic material may be a boride, carbide, nitride, or oxide of the elements aluminum, boron, silicon, titanium, tungsten, or zirconium (such as AlN, $Al_2O_3$, $B_4C$, BN, SiC, $Si_3N_4$, TiB, $TiB_2$, TiC, TiN, WC, and $ZrO_2$) and/or mixed phases and composites of these individual components.

It has proved especially advantageous, as the ceramic material, to use sintered silicon carbide with a density of between 3 and 3.2 $g/cm^3$. This material has extremely good mechanical strength, hardness, and abrasion resistance as well as good chemical resistance to the products of decomposition that are released in the welding of PVC.

To achieve good thermal conductivity as well, it has proved expedient to use a silicon-filtered silicon carbide (SiSiC). Preferably, a ceramic heating wedge of SiC with free silicon in excess is produced for this purpose. A proportion of approximately 85 to 95 weight % of silicon carbide and correspondingly 15 to 5 weight % of free metallic silicon has proved highly suitable. The density of this composite material is preferably between 3.08 and 3.12 $g/cm^3$.

Further details and advantages of the invention will become apparent from the ensuing exemplary embodiment described in conjunction with FIG. 1.

FIG. 1 shows a schematic side view of an arrangement having an electrically heatable heating wedge 1 according to the invention, two plastic sheets 2 and 3 to be welded together, and two contact-pressure rollers 4, 5 that rotate synchronously in opposite directions. The heating wedge 1 has a wedge shaped heating body having a wide end positionable toward a supply of the first and second sheets of plastic material 2, 3 and a narrow end positionable toward the opposed contact pressure rollers 4, 5 for pressing together and welding the first and second sheets of plastic material 2, 3 together after they have been heated by the wedge shaped heating element 1. The first and second sheets of plastic material 2, 3 slide along respective outer surfaces of the wedge shaped heating body 1 from a separated position at the wide end toward an adjacent position at the narrow end prior to entering the opposed pressure rollers 4, 5. The wedge shaped heating body 1 heats the sheets of plastic material as they slide along the respective outer surfaces of the wedge shaped heating body 1.

The heating wedge 1 of the invention comprises a composite material with a basic material of silicon carbide, which to improve the thermal conductivity was infiltrated with silicon by means of gas-phase infiltration. The resultant infiltrated silicon carbide had the following physical values:

| | |
|---|---|
| Proportion of silicon carbide: | ca. 85–95 weight % |
| Microstructure: | |
| open porosity | 0 vol. % |
| Mechanical properties: | |
| bending strength | 180–450 MPa |
| hardness (HV) | $14–25 \times 10^3$ Nmm$^{-2}$ |
| Thermal properties: | |
| specific thermal capacity | 650–1000 Jkg$^{-1}$ K$^{-1}$ |
| thermal conductivity | 110–160 Wm$^{-1}$ K$^{-1}$ |
| thermal variation (fluctuation) resistance | 400 K |
| maximum usage temperature | 1380° C. |

The infiltrated silicon carbide, as can be seen, has not only very good mechanical properties but also sufficiently good thermal conductivity. Moreover, it exhibits good resistance to the products of decomposition released in the welding of PVC film sheets.

It is understood that the invention is not limited to the exemplary embodiment described above.

List of Reference Numerals

1 Heating element, heating wedge
2, 3 Plastic sheets
4, 5 Contact-pressure rollers

The invention claimed is:

1. A heating element for contact welding, comprising:
a wedge shaped heating body for positioning between first and second sheets of plastic material, the wedge shaped heating body having a wide end positionable toward a supply of the first and second sheets of plastic material and a narrow end positionable toward opposed contact pressure rollers for pressing together and welding the first and second sheets of plastic material together after they have been heated by the wedge shaped heating element, the first and second sheets of plastic material being slideable along respective outer surfaces of the wedge shaped heating body from a separated position at the wide end toward an adjacent position at the narrow end prior to entering the opposed pressure rollers, the wedge shaped heating body heating the sheets of plastic material as they slide along the respective outer surfaces of the wedge shaped heating body;
at least a portion of the wedge shaped heating body for contacting the sheets of plastic material being formed of a composite material including a ceramic material to provide anti-sticking and abrasion resistant properties to the wedge shaped body against the sliding sheets of plastic material and a heat-conducting material to provide an enhanced thermal conductivity to the wedge shaped heating body, as compared to a thermal conductivity of the ceramic material alone, for heating the sheets of plastic material,
wherein the ceramic material is at least one of a boride, carbide, nitride, oxide, mixed phase and composite of at least one of aluminum, boron, silicon, titanium, tungsten, and zirconium; and
wherein the heat-conducting material is a metalloid.

2. The heating element according to claim 1, wherein the ceramic material comprises sintered silicon carbide with a density of between 3 and 3.2 g/cm$^3$.

3. The heating element according to claim 2, wherein the metalloid is silicon.

4. The heating element according to claim 3, wherein the composite material comprises silicon-filtered silicon carbide and has a density of between 3.08 and 3.12 g/cm$^3$.

5. The heating element according to claim 4, wherein the proportion of silicon in the silicon-filtered silicon carbide is between 5 and 15 weight %.

6. The heating element according to claim 1, wherein the metalloid is silicon.

7. The heating element according to claim 1, wherein the metalloid is free metallic silicon and the ceramic material is silicon carbide.

8. The heating element according to claim 7, wherein the composite material comprises 5-15% free metallic silicon and 85-95% silicon carbide.

9. The heating element according to claim 8, wherein the silicon carbide is the basic material of the composite material and the silicon carbide has been infiltrated with the free metallic silicon by gas-phase infiltration.

10. The heating element according to claim 9, wherein the composite material has a density of between 3.08 and 3.12 g/cm$^3$.

11. The heating element according to claim 8, wherein the composite material has a density of between 3.08 and 3.12 g/cm$^3$.

12. A method for contact welding, comprising:
providing a supply of first and second sheets of plastic material;
providing opposed contact pressure rollers for pressing together and welding together the first and second sheets of plastic material after they have been heated;
providing a wedge shaped heating body for positioning between the first and second sheets of plastic material upstream of the opposed contact pressure rollers, the wedge shaped heating body having a wide end positionable toward the supply of the first and second sheets of plastic material and a narrow end positionable toward the opposed contact pressure rollers;
sliding the first and second sheets of plastic material along respective outer surfaces of the wedge shaped heating body from a separated position at the wide end toward an adjacent position at the narrow end prior to entering the opposed pressure rollers;
heating the first and second sheets of plastic material with the wedge shaped heating body as they slide along the respective outer surfaces of the wedge shaped heating body;
pressing together and welding together the first and second sheets of plastic material with the opposed contact pressure rollers after the first and second sheets of plastic material have been heated;
providing that at least a portion of the wedge shaped heating body for contacting the sheets of plastic material is formed of a composite material including a ceramic material to provide anti-sticking and abrasion resistant properties to the wedge shaped heating body against the sliding sheets of plastic material and a heat-conducting material to provide an enhanced thermal conductivity to the wedge shaped heating body, as compared to a thermal conductivity of the ceramic material alone, for heating the sheets of plastic material,
providing that the ceramic material is at least one of a boride, carbide, nitride, oxide, mixed phase and composite of at least one of aluminum, boron, silicon, titanium, tungsten, and zirconium; and
providing that the heat-conducting material is a metalloid.

13. A device for contact welding, comprising:

opposed contact pressure rollers for receiving a supply of first and second sheets of plastic material, and pressing together and welding together the first and second sheets of plastic material after they have been heated;

a wedge shaped heating body positioned between the first and second sheets of plastic material ahead of the opposed contact pressure rollers, the wedge shaped heating body having a wide end positioned toward the supply of the first and second sheets of plastic material and a narrow end positioned toward the opposed contact pressure rollers such that the first and second sheets of plastic material slide along respective outer surfaces of the wedge shaped heating body from a separated position at the wide end toward an adjacent position at the narrow end prior to entering the opposed pressure rollers;

the wedge shaped heating body heating the first and second sheets of plastic material as they slide along the respective outer surfaces of the wedge shaped heating body;

the opposed contact pressure rollers pressing together and welding together the first and second sheets of plastic material with after the first and second sheets of plastic material have been heated;

wherein, at least a portion of the wedge shaped heating body for contacting the sheets of plastic material is formed of a composite material including a ceramic material to provide anti-sticking and abrasion resistant properties to the wedge shaped heating body against the sliding sheets of plastic material and a heat-conducting material to provide an enhanced thermal conductivity to the wedge shaped heating body, as compared to a thermal conductivity of the ceramic material alone, for heating the sheets of plastic material, wherein the ceramic material is at least one of a boride, carbide, nitride, oxide, mixed phase and composite of at least one of aluminum, boron, silicon, titanium, tungsten, and zirconium; and wherein the heat-conducting material is a metalloid.

\* \* \* \* \*